US012634396B2

(12) United States Patent
Ho et al.

(10) Patent No.: US 12,634,396 B2
(45) Date of Patent: May 19, 2026

(54) AUDIO SWITCHING DEVICE

(71) Applicant: BIZLINK INTERNATIONAL CORP., New Taipei City (TW)

(72) Inventors: Chien-Kuan Ho, New Taipei City (TW); Tsung-Hsien Lai, New Taipei City (TW); Tzung-Ling Lin, New Taipei City (TW)

(73) Assignee: BIZLINK INTERNATIONAL CORP., New Taipei City (TW)

( * ) Notice: Subject to any disclaimer, the term of this patent is extended or adjusted under 35 U.S.C. 154(b) by 331 days.

(21) Appl. No.: 18/407,836

(22) Filed: Jan. 9, 2024

(65) Prior Publication Data

US 2024/0236238 A1      Jul. 11, 2024

(30) Foreign Application Priority Data

Jan. 11, 2023   (TW) ................................. 112101262

(51) Int. Cl.
| | |
|---|---|
| *H04M 3/56* | (2006.01) |
| *G06F 3/16* | (2006.01) |
| *H04W 76/20* | (2018.01) |

(52) U.S. Cl.
CPC ............ H04M 3/568 (2013.01); G06F 3/162 (2013.01); G06F 3/165 (2013.01); H04W 76/20 (2018.02)

(58) Field of Classification Search
CPC ........ H04M 3/568; G06F 3/162; G06F 3/165; H04W 76/20; H04R 1/20
USPC ........................................................ 455/416
See application file for complete search history.

(56) References Cited

U.S. PATENT DOCUMENTS

| | | | | |
|---|---|---|---|---|
| 5,454,036 A | * | 9/1995 | Gleeman ................. | H04M 1/65 |
| | | | | 379/442 |
| 2019/0190963 A1 | * | 6/2019 | Lawson .............. | H04L 65/1069 |
| 2020/0007689 A1 | * | 1/2020 | Cinelli .................. | H04L 67/133 |
| 2020/0128127 A1 | * | 4/2020 | Bennett ................. | H04L 63/304 |
| 2023/0262387 A1 | * | 8/2023 | An .......................... | G06F 3/165 |
| | | | | 700/94 |
| 2024/0179465 A1 | * | 5/2024 | Yang .................... | H03K 17/063 |

FOREIGN PATENT DOCUMENTS

| | | |
|---|---|---|
| CN | 105872942 | 8/2016 |
| CN | 108616669 | 10/2018 |
| TW | 200810379 | 2/2008 |
| TW | 201318402 | 5/2013 |
| TW | 1516987 | 1/2016 |
| TW | 1523532 | 2/2016 |

* cited by examiner

*Primary Examiner* — Don N Vo
(74) *Attorney, Agent, or Firm* — CKC & Partners Co., LLC

(57) ABSTRACT

An audio switching device is provided. The audio switching device includes a communication module. The communication module is configured to provide a first audio channel, a second audio channel and a third audio channel. The first audio channel is configured to communicatively connect to a first external device, the second audio channel is configured to communicatively connect to a second external device, and the third audio channel is configured to communicatively connect to a third external device. When the audio switching device is operated in a first mode, the first audio channel, the second audio channel and the third audio channel are communicatively connected to each other, so as to allow a three-way calling.

15 Claims, 2 Drawing Sheets

AUDIO SWITCHING DEVICE

CROSS-REFERENCE TO RELATED APPLICATION

This application claims priority to Taiwan application Serial Number 112101262, filed Jan. 11, 2023, which is herein incorporated by reference in its entirety.

BACKGROUND

Field of Invention

The disclosure relates to an audio switching device. More particularly, the disclosure relates to an audio switching device with the three-way calling function.

Description of Related Art

The audio switching device can be communicatively connected to several external devices at the same time, and the audio switching device can switch between several audio channels to choose the connected external device. However, current audio switching devices only provide one-to-one calling functions and cannot achieve three-party listening and calling functions.

SUMMARY

The disclosure provides an audio switching device. The audio switching device includes a communication module. The communication module is configured to provide a first audio channel, a second audio channel and a third audio channel. The first audio channel is configured to communicatively connect to a first external device, the second audio channel is configured to communicatively connect to a second external device, and the third audio channel is configured to communicatively connect to a third external device. When the audio switching device is operated in a first mode, the first audio channel, the second audio channel and the third audio channel are communicatively connected to each other, so as to allow a three-way calling.

The disclosure provides an audio switching device. The audio switching device includes a first chip, a second chip, and a processing circuit. The first chip is configured to provide a first audio channel. The first audio channel is configured to communicatively connect to a first external device. The second chip is configured to provide a second audio channel and a third audio channel. The second audio channel is configured to communicatively connect to a second external device, the third audio channel is configured to communicatively connect to a third external device. The processing circuit is coupled to the first chip and the second chip. When the audio switching device is operated in a first mode, the first audio channel, the second audio channel and the third audio channel are communicatively connected to each other, so as to allow a three-way calling.

It is to be understood that both the foregoing general description and the following detailed description are demonstrated by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
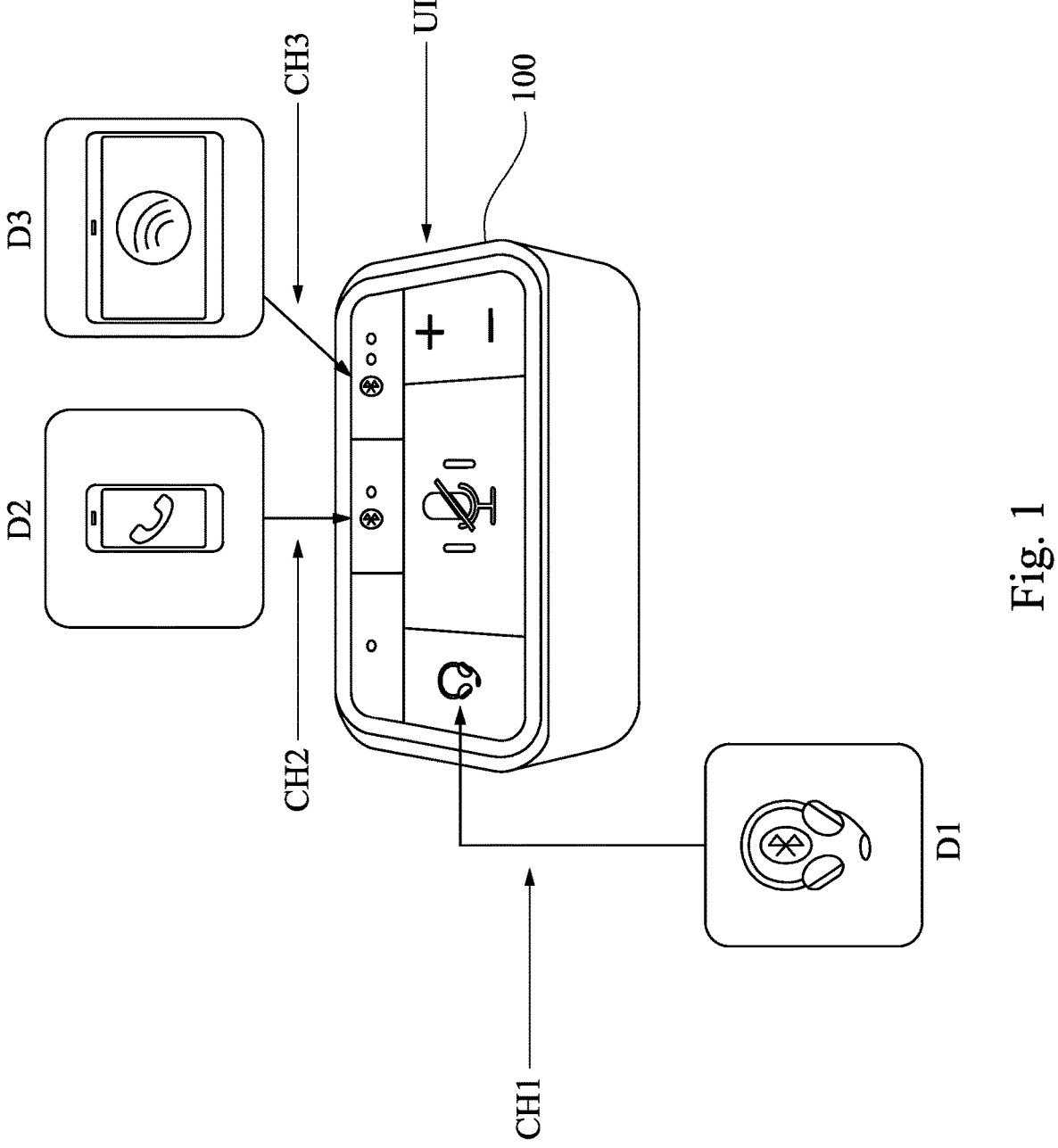
FIG. 1 is a schematic diagram illustrating an audio switching device in accordance with some embodiments of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating an audio switching device 100 in accordance with some embodiments of the disclosure. As illustrated in FIG. 1, the audio switching device 100 simultaneously provides audio channel CH1, audio channel CH2 and audio channel CH3. The audio channel CH1 is communicatively connected to the external device D1, the audio channel CH2 is communicatively connected to the external device D2, the audio channel CH3 is communicatively connected to the external device D3.

The external devices D1, D2, D3 can be headphones, microphones, mobile phones, tablets, computers or other devices with audio receiving and transmitting or similar functions. As illustrated in FIG. 1, in some embodiments, the external device D1 is a headphone, the external device D2 is a mobile phone, and the external device D3 is a tablet.

In some embodiments, the audio channels CH1, CH2, CH3 are Bluetooth channels.

In some embodiments, the External device D1 is the local side communication device, while the external device D2 and external device D3 are remote side communication devices.

As illustrated in FIG. 1, the audio switching device 100 further includes an operation interface UI. The user inputs commands to the audio switching device 100 through the operation interface UI.

The audio switching device 100 as illustrated in FIG. 1 is for illustration only, and the embodiments of the present disclosure are not limited to FIG. 1.

Details about the operations of the audio switching device 100 are described below with reference to the audio switching device 100 in FIG. 2.

Figure 2:
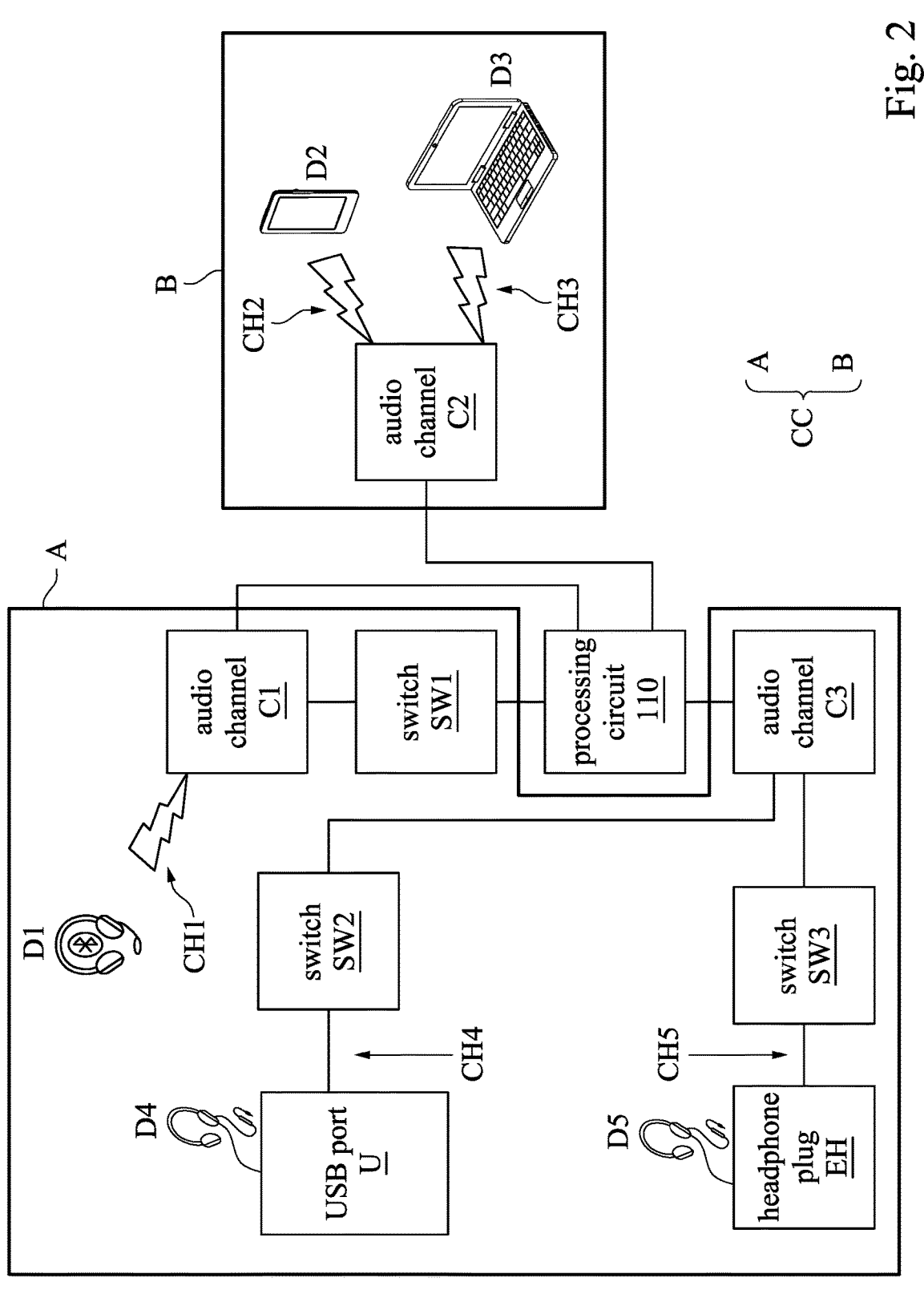
FIG. 2 is a schematic diagram illustrating a circuit of the audio switching device in accordance with some embodiments of the disclosure.

Reference is made to FIG. 2. FIG. 2 is a schematic diagram illustrating a circuit of the audio switching device 100 in accordance with some embodiments of the disclosure. However, the embodiments of the present disclosure are not limited thereto.

As illustrated in FIG. 2, the audio switching device 100 includes the communication module CC and the processing circuit 110. The communication module CC and the processing circuit 110 are coupled to each other. The communication module CC includes a local side A and a remote side B. The local side A and the remote side B couple to each other through the processing circuit 110.

The local side A includes the chip C1. In this example, the chip C1 is a Bluetooth chip, which is, for example, the 8753BAU type chip available on the market. The chip C1 and the processing circuit 110 couple to each other. The chip C1 is configured to provide audio channel CH1 and is communicatively connected to the external device D1 through the audio channel CH1.

The remote side B includes the chip C2. In an example, chip C2 is a dual-channel Bluetooth chip, which is, for example, a commercially available BM83 chip. The chip C2 is coupled to the processing circuit 110. The chip C2 is configured to provide the audio channel CH2 and the audio channel CH3. The audio channel CH2 is communicatively connected to the external device D2 are, and the audio channel CH3 is communicatively connected to the external device D3.

In some embodiments, the audio switching device 100 includes a first mode and a second mode. When the audio switching device 100 is operated in the first mode, the processing circuit 110 enables the external devices D1, D2, and D3 to be communicatively connected to each other through the audio channels CH1, CH2, and CH3 at the same time to perform three-way calling.

In detail, the processing circuit 110 transmits the information of the external device D1 to the external devices D2 and D3, the processing circuit 110 transmits the information of the external device D2 to the external devices D1 and D3, and the processing circuit 110 transmits the information of the external device D3 to the external devices D1 and D2.

In an operating embodiment, when a user of the local side wants to make a three-way call with a user of the remote side, the user of the local side can put on external device D1 (such as a headphone) and call through the external device D2 (such as a mobile phone) and the external device D3 (such as a computer) to connect to the user of the remote side. When the audio switching device 100 operates in the first mode, through the processing circuit 110, the user of the local side can perform three-way call with the other users at the other two remote sides at the same time. Furthermore, the user of the local side does not need to play the sound publicly, the user of the local side can hear the audio of the external device D2 and the external device D3 through the external device D1 (such as a headphone), which can increase privacy.

In some embodiments, when the audio switching device 100 is operated in the second mode, the processing circuit 110 controls the audio channel CH1 to selectively to be communicatively connected to one of the audio channel CH2 and the audio channel CH3.

For example, in an embodiment, during the second mode, the processing circuit 110 makes the audio channel CH1 and the audio channel CH2 to be communicatively connected. Users of the local side can communicate with users of the remote side by connecting through the external device D1 and the external device D2. At this time, the external device D3 cannot communicate with the external device D1 and the external device D2.

In another embodiment, in the second mode, the processing circuit 110 makes the audio channel CH1 and the audio channel CH3 to be communicatively connected. User of the local side can communicate with user of the remote side by connecting through the external device D1 and the external device D3. At this time, the external device D2 cannot communicate with the external device D1 and the external device D3.

Therefore, user using the external device D1 of the local side can choose to have a one-to-one call with the external device D2, or, user using the external device D1 can choose to have a one-to-one call with the external device D3.

The user of the local side as mentioned above refers to the user who is located next to the audio switching device 100 and can operate the audio switching device 100, and user of the remote side refer to the user who is connected through the external device D2 or the external device D3 and cannot operate the audio switching device 100.

As illustrated in FIG. 2, in some embodiments, the audio switching device 100 further includes the chip C3. In this example, the chip C3 is a USB switch chip, which is, for example, a commercially available TLV320AIC3104 audio source switch chip.

The chip C3 is coupled to the processing circuit 110. The chip C3 is configured to provide the audio channel CH4 and the audio channel CH5. In some embodiments, the processing circuit 110 is further configured to selectively connect to one of the first audio channel CH1, the fourth audio channel CH4 and the fifth audio channel CH5, and meanwhile, the processing circuit 110 does not connect to the reset two of the first audio channel CH1, the fourth audio channel CH4 and the fifth audio channel CH5 according to a predetermined priority sequence or according to a user's setting.

In some embodiments, the audio channel CH4 couples to the chip C3 through the switch SW2, the audio channel CH5 couples to the chip C3 through the switch SW3, the audio channel CH1 couples to the chip C1 through the switch SW1. The switch SW1 is configured to control the connection status of the audio channel CH1, while the switch SW2 and the switch SW3 are configured to control the connection status of the audio channels CH4 and CH5. In some embodiments, the switch SW2 and the switch SW3 can be implemented as electronic or physical switches (such as buttons). In an example, the switch SW1, the switch SW2 and the switch SW3, in sequence, are analog signal switches of the PI3USB102GZLEX, TSA225E and TSA225E types available on the market.

In an embodiment, When the user chooses the audio channel CH4 through the operation interface UI, the switch SW2 is conducted, and the user of the local side can output or receive the audio source through the external device D4 connected to USB port U. At this time, the switch SW1 and the switch SW3 do not conduct.

In another embodiment, when the user chooses the audio channel CH5 through the operation interface UI, the switch SW3 is conducted, and the user of the local side can output or receive the audio source through the external device D5 connected to the headphone plug EH. At this time, the switch SW1 and the switch SW2 do not conduct.

In one another embodiment, when the user chooses the audio channel CH1 through the operation interface UI, the switch SW1 is conducted, and the user of the local side can output or receive the audio source through the external device D1, while the switches SW2 and SW3 are not turned on at this time.

In some embodiments, the user can use the operation interface UI to switch the audio switching device 100 to operate in the first mode or the second mode. The user can also use the operation interface UI to choose one of the audio channels CH1, CH4 and CH5 to output the audio source or to receive the audio source. In the second mode, the user can choose to connect to the external device D2 or the external device D3 through the operation interface UI. The operation interface UI is configured to receive the control signal according to the user's operation, so as to switch the audio switching device 100 to operate in the first mode or the second mode, and the audio switching device 100 chooses one of the audio channels CH1, CH4 and CH5 to output the audio source or to receive the audio source, or the audio switching device 100 choose to connect to the external device D2 or the external device D3.

In some embodiments, the processing circuit 110 may be, but is not limited to, a single processing circuit or a collection of multiple micro-processing circuits. In an example, the processing circuit 110 is a microcontroller (MCU), which is, for example, a commercially available STM32H750IBK6 chip. The processing circuit 110 is configured to switch the connection relationships between the audio channels CH1, CH2, CH3, CH and CH5 and to perform audio source integration procedures.

In some embodiments, the communication module CC can be implemented as a communication circuit.

In some embodiments, the external devices D1, D2 and D3 are continuously connected to the audio switching device 100 through audio channels CH1, CH2 and CH3. The processing circuit 110 controls whether the external devices D1, D2 and D3 can output or receive audio sources by controlling the switch SW1 or the chip C1 and the chip C2.

In summary, the embodiments of the present disclosure provide an audio switching device. The audio switching device can operate in two different modes.

Three-way calling is possible in the first mode, and one-to-one calling is possible in the second mode. Furthermore, users of the local side can also choose different audio channels to transmit and receive audio. They can choose to transmit and receive audio through Bluetooth, USB or 3.5MM headphone plug, which is very convenient. In addition, in the embodiment of the present disclosure, three-way calling can be performed without publicly playing the audio, thus providing privacy.

Although the present invention has been described in considerable detail with reference to certain embodiments thereof, other embodiments are possible. Therefore, the spirit and scope of the appended claims should not be limited to the description of the embodiments contained herein.

What is claimed is:

1. An audio switching device, comprising:
a communication module, configured to provide a first audio channel, a second audio channel and a third audio channel;
wherein the first audio channel is configured to communicatively connect to a first external device, the second audio channel is configured to communicatively connect to a second external device, and the third audio channel is configured to communicatively connect to a third external device;
wherein when the audio switching device is operated in a first mode, the first audio channel, the second audio channel and the third audio channel are communicatively connected to each other, so as to allow a three-way calling.

2. The audio switching device of claim 1, wherein when the audio switching device is operated in a second mode, the first audio channel selectively to be communicatively connected to only one of the second audio channel and the third audio channel.

3. The audio switching device of claim 2, further comprising:
an operation interface, configured to receive a control signal to switch the audio switching device to be operated in the first mode or the second mode.

4. The audio switching device of claim 3, further comprising:
a processing circuit, configured to switch a plurality of connection relationship between the first audio channel, the second audio channel and the third audio channel.

5. The audio switching device of claim 4, further comprising:
a chip, coupled to the processing circuit, and configured to provide a fourth audio channel and a fifth audio channel;

wherein the processing circuit is configured to connect to one of the first audio channel, the fourth audio channel and the fifth audio channel according to a predetermined priority sequence.

6. The audio switching device of claim 1, wherein the first audio channel, the second audio channel and the third audio channel are a plurality of Bluetooth channels.

7. An audio switching device, comprising:
a first chip, configured to provide a first audio channel, wherein the first audio channel is configured to communicatively connect to a first external device;
a second chip, configured to provide a second audio channel and a third audio channel, wherein the second audio channel is configured to communicatively connect to a second external device, the third audio channel is configured to communicatively connect to a third external device; and
a processing circuit, coupled to the first chip and the second chip, wherein when the audio switching device is operated in a first mode, the first audio channel, the second audio channel and the third audio channel are communicatively connected to each other, so as to allow a three-way calling.

8. The audio switching device of claim 7, further comprising:
a third chip, coupled to the processing circuit, and configured to provide a fourth audio channel and a fifth audio channel;
wherein the processing circuit is further configured to selectively connect to one of the first audio channel.

9. The audio switching device of claim 8, wherein the processing circuit is further configured to not to connect to two of the first audio channel, the fourth audio channel and the fifth audio channel.

10. The audio switching device of claim 8, further comprising:
a first switch, coupled between the first chip and the processing circuit, and is configured to control a connection status of the first audio channel.

11. The audio switching device of claim 10, further comprising:
a second switch, coupled to the third chip, and is configured to control a connection status of the fourth audio channel and a connection status of the fifth audio channel.

12. The audio switching device of claim 7, wherein when the audio switching device is operated in a second mode, the processing circuit is further configured to control the first audio channel to selectively to be communicatively connected to only one of the second audio channel and the third audio channel.

13. The audio switching device of claim 7, further comprising:
an operation interface, configured to receive a control signal to switch the audio switching device to be operated in the first mode or a second mode.

14. The audio switching device of claim 13, wherein the processing circuit is further configured to switch a plurality of connection relationship between the first audio channel, the second audio channel and the third audio channel.

15. The audio switching device of claim 7, wherein the first audio channel, the second audio channel and the third audio channel are a plurality of Bluetooth channels.

* * * * *